(12) United States Patent
Bernardini

(10) Patent No.: US 10,863,716 B2
(45) Date of Patent: Dec. 15, 2020

(54) HOUSING CAGE FOR LABORATORY ANIMALS

(71) Applicant: TECNIPLAST S.P.A., Buguggiate (IT)

(72) Inventor: Pietro Bernardini, Crosio Della Valle (IT)

(73) Assignee: Techniplast S.P.A., Buguggiate (IT)

( * ) Notice: Subject to any disclaimer, the term of this patent is extended or adjusted under 35 U.S.C. 154(b) by 483 days.

(21) Appl. No.: 15/566,433

(22) PCT Filed: Apr. 14, 2016

(86) PCT No.: PCT/EP2016/058254
§ 371 (c)(1),
(2) Date: Oct. 13, 2017

(87) PCT Pub. No.: WO2016/166234
PCT Pub. Date: Oct. 20, 2016

(65) Prior Publication Data
US 2018/0116168 A1 May 3, 2018

(30) Foreign Application Priority Data
Apr. 14, 2015 (IT) .................. 102015000011767

(51) Int. Cl.
*A01K 1/03* (2006.01)
(52) U.S. Cl.
CPC .................. *A01K 1/031* (2013.01)
(58) Field of Classification Search
CPC ........ A01K 1/031; A01K 1/032; A01K 1/033; A01K 1/034
USPC ........ 119/418, 416, 417, 421, 452, 458, 475
See application file for complete search history.

(56) References Cited

U.S. PATENT DOCUMENTS

| | | | | |
|---|---|---|---|---|
| 3,771,686 | A * | 11/1973 | Brison ................. | A01K 1/0245 220/4.21 |
| 4,343,261 | A * | 8/1982 | Thomas ................. | A01K 1/031 119/418 |
| 4,998,506 | A * | 3/1991 | Frostad ................. | A01K 1/0227 119/475 |
| D533,971 | S * | 12/2006 | Carter ........................ | D30/108 |

(Continued)

FOREIGN PATENT DOCUMENTS

| | | |
|---|---|---|
| AU | 2011100541 A4 | 6/2011 |
| WO | 2013073069 A1 | 5/2013 |

OTHER PUBLICATIONS

International Preliminary Report on Patentability, completed May 30, 2017 for PCT Application No. PCT/EP2016/056254, filed Apr. 14, 2016.

*Primary Examiner* — Ebony E Evans
(74) *Attorney, Agent, or Firm* — Abelman, Frayne & Schwab

(57) ABSTRACT

The present invention relates to a cage (100) for housing laboratory animals, typically rodents, and in particular to an individually ventilated cage (WC). The housing cage (100) according to the present invention allows to optimize the density of cages on a shelving rack, in terms of rows of cages, while complying with dimensional constraints in terms of minimum surface of the base which can be treaded on by the animals and minimum inner height of the cage. Furthermore, the cage according to the present invention comprises environmental enrichment devices (14) for the animals integrated in the base (11).

5 Claims, 7 Drawing Sheets

(56) References Cited

U.S. PATENT DOCUMENTS

| | | | | |
|---|---|---|---|---|
| 8,037,847 | B2* | 10/2011 | Malnati | A01K 1/031 119/418 |
| 9,516,857 | B2* | 12/2016 | Conger | A01K 1/0047 |
| 9,992,969 | B2* | 6/2018 | Chang | A01K 1/031 |
| 2007/0079765 | A1* | 4/2007 | Carter | A01K 1/031 119/456 |
| 2007/0193527 | A1* | 8/2007 | Verhage | A01K 1/031 119/418 |
| 2009/0165729 | A1* | 7/2009 | Tamborini | A01K 1/031 119/418 |
| 2009/0211147 | A1* | 8/2009 | Denicourt | H05C 1/02 43/98 |
| 2012/0234255 | A1* | 9/2012 | Bernardini | A01K 1/031 119/417 |
| 2016/0150758 | A1* | 6/2016 | Salem | A01K 29/005 119/421 |
| 2019/0014740 | A1* | 1/2019 | Bernardini | A01K 1/031 |

\* cited by examiner

HOUSING CAGE FOR LABORATORY ANIMALS

CROSS-REFERENCE TO RELATED APPLICATION

This application claims benefit under 35 U.S.C. § 371 to international application No. PCT/EP2016/058254, filed on Apr. 14, 2016, which claims priority to Italian application no. 102015000011767, filed Apr. 14, 2015, the contents of which are incorporated by reference in their entireties.

FIELD OF THE INVENTION

The present invention relates to an individually ventilated cage (IVC) for housing laboratory animals, typically rodents.

It known, the housing of animals, in this case of rodents in particular, in laboratories is governed by standards which require given dimensional parameters for the housing cages according to the size and/or body weight of the animal.

More in detail, the regulations currently in force require housing cages to have a surface of at least 100 $cm^2$ for each animal and in all cases a base area of at least 330 $cm^2$ for adult rats with body weight higher than 30 grams.

Since two, three or more animals (typically groups of five adult animals) are normally kept in each housing cage, the treadable surface which must be available to each rat according to the regulations makes the cages very large.

As known, the cages are arranged side-by-side in laboratories on appropriate shelving racks, and it is therefore obvious that the dimensions of the cages is a fundamental parameter which effects the number of cages, and thus of animals, which can be housed in a laboratory.

Therefore, housing cages which comply with regulations with regards to space available to animals are known, which in all cases display the drawback of not rationalizing such a space, resulting in excessive total dimensions of the cage.

Furthermore, it has been found that a cage of unsuitable height has a negative effect on the behavioral aspects of the animal, in particular of the rat, with regards to activities such as play, competition and patrolling, for which standing posture is normally assumed. Such a negative effect may even considerably alter the natural behavior of the animal.

More in detail, the regulations currently in force require housing cages to have an inner height of at least 12 cm for adult rats having a body weight higher than 30 grams.

Some regulations also require that at least 50% of the base surface must guarantee a height not lower than that of the regulations mentioned above.

Not last, the guidelines suggest the use of environmental enrichment devices which can make the height of the cage more exploitable by the animal allowing, for example, to build nests and/or to increase motor activity as well as to minimize episodes of competition between dominating animals housed in group.

Such enrichment devices positively influence various aspects of animal development from the psychological-physiological point of view, reducing stress levels and increasing the reliability of the results deriving from scientific experiments because the animal is put into the condition of adopting a behavior which is more similar to that it would have in natural conditions (the reference is to the "wild" phenotype).

The importance of achieving the highest density of cages in the housing rooms with IVC systems, the floor area occupied by the IVC shelving rack being equal, is also known.

Indeed, the cages are inserted on specific shelving racks adapted to accommodate a plurality of cages arranged on various levels. Despite needing to guarantee the minimum base area and the minimum inner height of each cage established by the guidelines, a cage-shelving rack system which allows to have more levels of cages, the maximum height of the shelving rack being equal, is certainly appreciated and preferred with respect to a system with fewer levels.

The more cages installable on the floor area occupied by the shelving rack used for arranging them, the lower the costs for scientific research because a smaller housing surface to the advantage of a higher density of cages allows to reduce the costs for constructing, conditioning and maintaining the spaces themselves to the advantage of funding/investments which may be used for research.

PRIOR ART

Various devices capable of providing an environmental enrichment for the animals housed in a cage are known.

Examples of such devices are known on the market with the names "Mouse Loft" and "Mouse Balcony", made by the Applicant. Substantially, such additional device create a second raised level in the cage with respect to the bottom of the base.

The same concept is followed by other accessories, such as small "houses" which can be used by the animals as nests. An example is the device named "Mouse House", made by the Applicant.

While most enrichment devices are autoclavable and thus reusable, disposable devices which are disposed of after use when the cage is changed are also known on the market.

With regards to maximum cage density in animal housing facilities, IVC shelving racks consisting of a given number of cages arranged on several rows and columns are known in the sector: shelving racks with a variable number of columns are generally available to occupy animal housing rooms of various floor size in the best manner while maintaining the maximum number of rows in height.

However, ideally but not necessarily, the height of each shelving rack for cages should be lower than 2 meters high for ergonomic reasons related to the access by the operator to the cages positioned on the highest rows without needing to use steps or other ergonomically appropriate devices. Indeed, it must be considered that when positioning or taking a cage the hands of the operator will be occupied by the cage itself and consequently it would be appropriate not to force the person to use steps.

Furthermore, the maximum limit of 2 meters for the height of a shelving rack must be respected to allow moving the shelving rack itself within the animal housing facility in order to allow it to pass through the doors of the rooms and to insert the entire shelving rack in washing and sterilizing machines.

The enrichment systems known until today have the drawback of being separate parts which need to be added to the cage and transported, washed and sterilized separately, or disposed of if disposable, and constitute an additional component to those forming the cage itself, typically base, lid and cover.

This implies a risk of potential cross-contamination between the various components, in addition to additional costs and times for processing the environmental enrichment accessories as well, which can be summarized in the difficulty of processing the additional components which often cannot be moved in completely or at least partially automatic manner during the processes of disassembly, washing, sterilization, re-assembly and transporting of components of cages, fact which occurs instead in general for the base, lid and cover components.

With regards to density optimization, until today shelving racks are known which allow to stack no more than 10 rows of cages over one another on the shelving racks, minimizing the vertical distance between one cage and the next, all remaining under the maximum height of 2 meters. Possible ventilation systems may cause a hindrance over the shelving rack but are easily removable.

Given the mentioned need to respect the inner height and the minimum base area for each cage, animal housing systems, and in particular cages, which allow to reach highest cage densities in height are not known today.

Today, as mentioned, there cannot be more than 10 rows of cages on the shelving racks.

This limit is also determined by the need to comply with another fundamental requirement, i.e. the need to have sufficient space between the cover of a cage inserted in a cage position and the bottom of a cage inserted in a cage position of the adjacent upper row to pull out the laboratory animal watering bottle, which is positioned preferably externally to the cage, in general partially accommodated in the cover, and through which water is supplied to the animals.

The bottle must be extractable by the operator in order to be replaced even when the cages are inserted in the shelving rack without needing to preventively remove the cage itself from the shelving rack in order not to disturb the animals while refilling with water.

The bottle is changed once a week and would otherwise constitute an effect of repeated, frequent stress for the animals, in addition to additional time and costs, if the operator needed to move the cage removing it from the shelving rack. The bottle must be substantially positioned near the cover in order to allow the water to fall by gravity after the animal accesses the perforated end of the beak of the bottle cap.

This factor, together with the minimum inner height of the cage required by regulations, has contributed to preventing achieving a higher density until today.

SUMMARY OF THE INVENTION

It is thus the main task of the present invention to provide a housing cage for laboratory animals which allows to adequately comply with the requirements illustrated above, eliminating the drawbacks left unsolved by the cages of known type.

In the scope of this task, it is the object of the present invention to provide a cage for housing animals which complies with regulations concerning the minimum surface available to each animal and the minimum height of each cage, optimizing the density of cages which can be housed on a shelving rack.

More in detail, it is the object of the present invention to provide a cage for housing laboratory animals which, while complying with regulations in terms of minimum area of the base and minimum height of the assembled cage, has an overall dimension which allows to maximize the cage density on a shelving rack.

Not last, it is the object of the present invention to provide a cage for housing laboratory animals which, while having a small overall dimension and allowing to maximize the density of cages which can be inserted in a shelving rack, incorporates an environment enrichment system for animals comprised in the cage base at the same time.

Again, it is the object of the present invention to provide a cage for housing animals which, while allowing to maximize the number of rows of superimposed cages in a shelving rack having maximum height of 2 meters, allows a laboratory technician to extract and reposition the watering bottle easily and without needing to remove the cage from the cage position on the shelving rack.

This task and the other objects which will become more apparent hereinafter are achieved by a cage for housing laboratory animals of the individual ventilation cage (IVC) type, comprising a base and a lid which can be associated in removable manner to a watering bottle, said base comprising a bottom wall defining a base plane and having an inner surface which can be treaded on by the animals and an outer surface. The housing cage according to the present invention is characterized in that said outer surface of said bottom wall has at least one recess positioned so that, when said cage is placed in a cage position of a housing facility shelving rack, said recess is at said seat obtained on the lid of a corresponding cage inserted in the cage position underneath.

The cage base for housing laboratory animals, according to the present invention, to which a lid can be associated, is characterized in that said cage base comprises a bottom wall defining a base plane and an inner surface which can be treaded on by the animals, said inner surface comprising one or more raised portions protruding from said base plane towards the inside of the cage base.

The base according to the present invention is further characterized in that said outer surface of said bottom wall comprises one or more recesses, preferably one of said one or more recesses corresponds to each of said one or more portions raised on the inner surface of said bottom wall.

BRIEF DESCRIPTION OF THE FIGURES

Further features and advantages of the present invention will be more apparent from the following detailed description provided by way of non-limitative example and illustrated in the accompanying figures, in which.

DETAILED DESCRIPTION OF THE INVENTION

Figure 1:
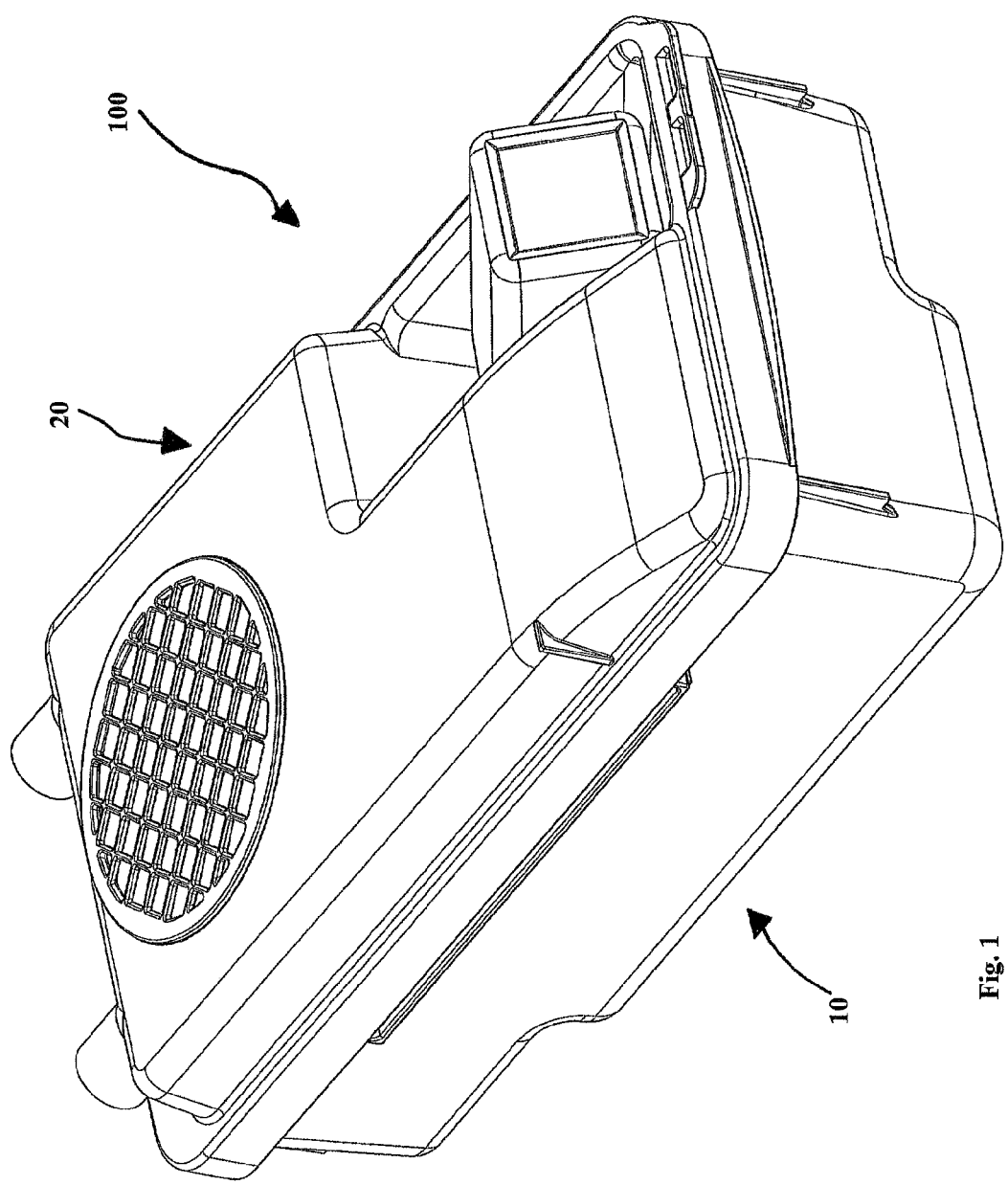
FIG. 1 shows a perspective view of the assembled housing cage according to the present invention.
Figure 2:
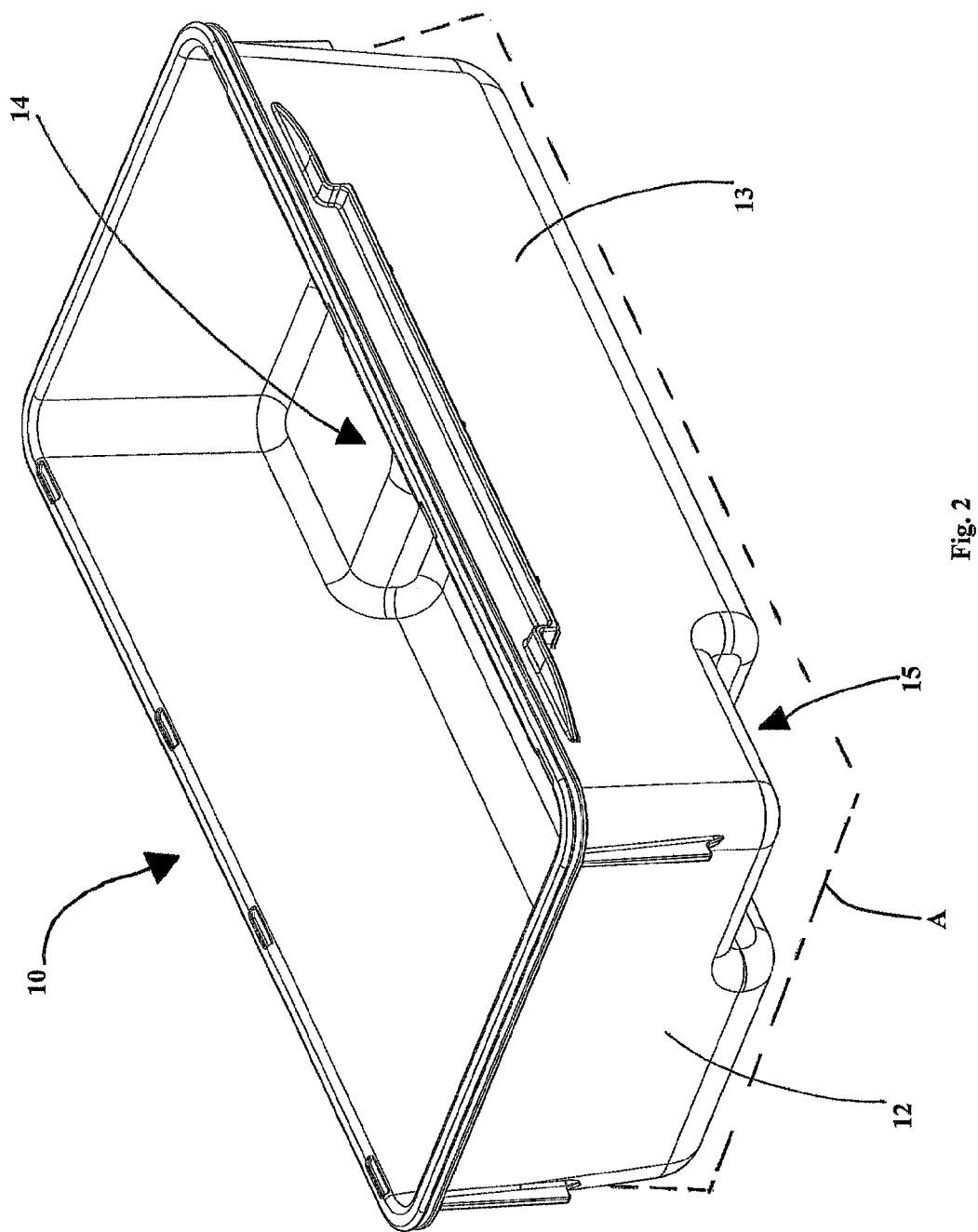
FIG. 2 shows a perspective view of the cage base according to the present invention.
Figure 3:
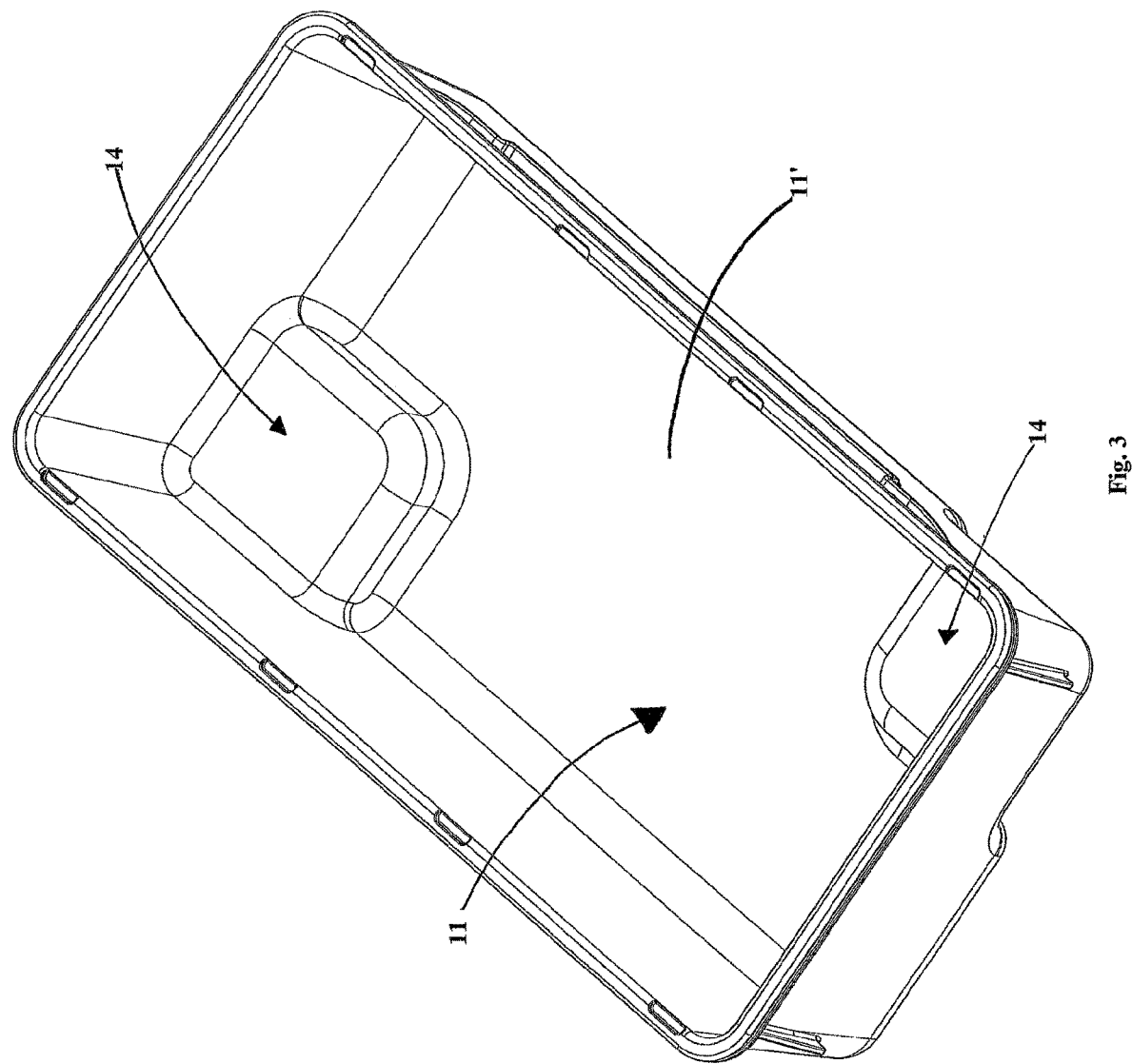
FIG. 3 shows a perspective top view of the cage base according to the present invention.
Figure 4:
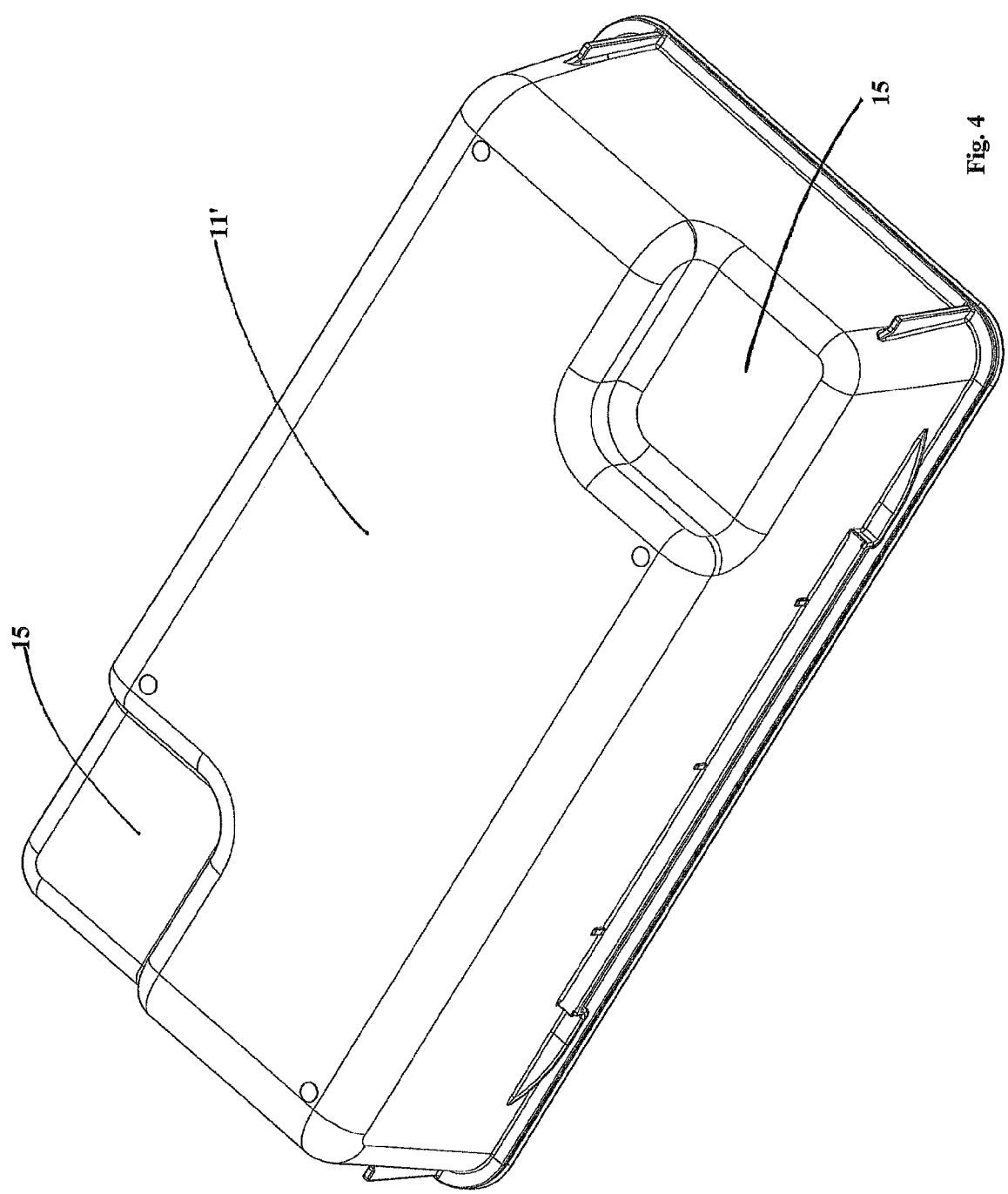
FIG. 4 shows a perspective bottom view of the cage base according to the present invention.

According to a preferred embodiment of the present invention illustrated by way of non-limiting example in the accompanying figures, the housing cage 100 according to the present invention is of the individual ventilation cage (IVC) type and comprises a base 10 and a lid 20.

Said lid 20 further comprises at least one seat 21 adapted to accommodate a watering bottle 300.

The forced ventilation cages comprise means 30 for connecting to the ventilation system 200 present on the shelving rack.

According to the preferred embodiment shown in the accompanying figures, said connection means 30, in general consisting of a pair of valves for letting air in and out respectively, are positioned in the rear zone of the cage, preferably at the rear zone of the lid.

The housing cage 100 according to the present invention comprises a base 10, which preferably has a substantially rectangular shape with a pair of short sides 12 and a pair of long sides 13 which surround a bottom wall 11, which in turn defines an inner surface 11' of the base and an outer surface 11" of the base. For ease of presentation, reference will be made to the direction parallel to the direction identified by the long sides 13 of the base as longitudinal direction and to the direction parallel to the short sides 12 of said base as transversal direction.

With particular reference to the figures from 2 to 4, base 10 according to the present invention comprises a bottom wall 11 defining a base plane A and an inner surface 11' which can be treaded on by the animals, said inner surface 11' comprising one or more raised portions 14 which protrude from said base plane A towards the inside of the cage base.

Preferably, as shown in the accompanying figures, raised portions 14 are defined by the bottom wall 11 itself.

Furthermore, bottom wall 11 of said base 10 has an outer surface 11" which bottom has at least one recess 15.

Preferably, said recess 15 is positioned so that when said cage 100 is placed in a cage position of a housing shelving rack, it is at said seat 21 obtained on lid 20 of a similar cage 100 inserted in the cage position underneath.

Even more preferably, said at least one recess 15 is obtained in the same zone of said bottom wall 11 of said raised portion 14, which is advantageously the same bottom wall 11 which has an appropriately shaped profile so as to define at least one raised portion 14 on the inner surface 11' thereof and a corresponding recess 15 on its outer surface 11".

Said raised portion 14 preferably has a quadrangular, preferably square profile.

According to preferred embodiment of the present invention shown in the accompanying figures by way of non-limiting example of the present invention, at least one recess 15 is preferably positioned adjacent to one of the short sides 12 of the base 10. Even more preferably, said at least one recess 15 is positioned adjacent to one of the short sides 12 and to one of the long sides 13 of said base 10, thus in angular position.

Preferably, said recess 15 has a quadrangular, e.g. square, profile.

Then, according to a preferred embodiment of the present invention, at least two recesses 15, having identical shape and size, are present on the outer surface 11" and arranged at two diametrically opposite edges of said base 10. In this manner, base 10 can still be indifferently used by the operator and indifferently associated to the lid without needing to remember to position the base with respect to the lid being careful to identify a front side and a rear side. Indeed, by turning the base by 180° the operator will always have at least one recess 15 positioned at a front edge and always in the same position.

Although the base may have an axial and transversal symmetry, as the base illustrated by way of example on the accompanying drawings, and thus does not have a front side and a rear side, as mentioned above with regards to the presence of connection means 30 to the forced ventilation circuit in the rear zone of lid 20, cage 100, consisting of a base 10 and a lid 20 associated thereto, will have a front part and a rear part, the rear part being the one which is inserted in the cage position of a housing shelving rack and is connected to ventilation system 200 on the shelving rack, the front part being the one which faces the outside of the shelving rack and remains visible as well as immediately reachable by the operator.

Figure 5:
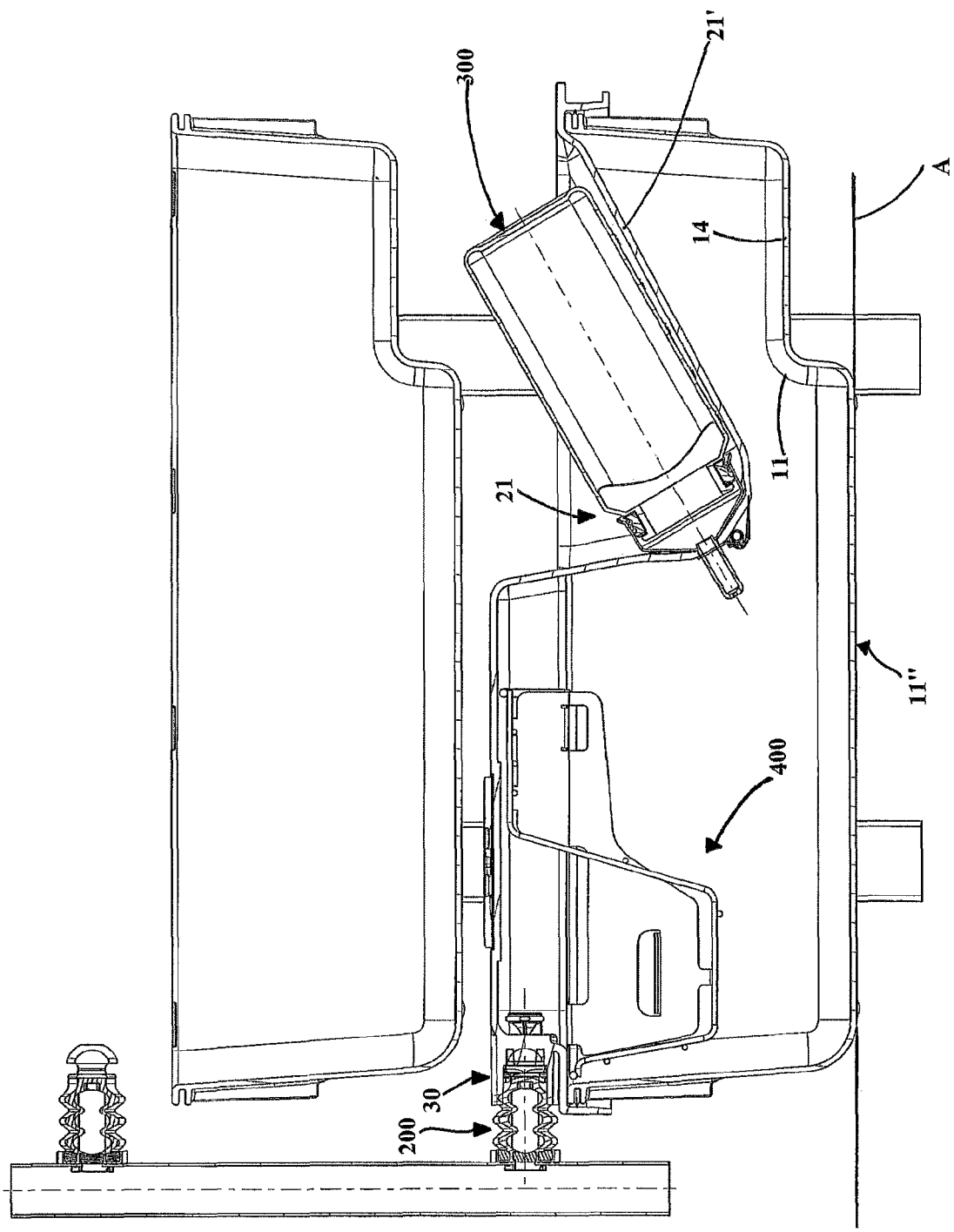
FIG. 5 shows a side section view of two cages according to the present invention inserted in the respective cage positions on an animal housing shelving rack.
Figure 6:
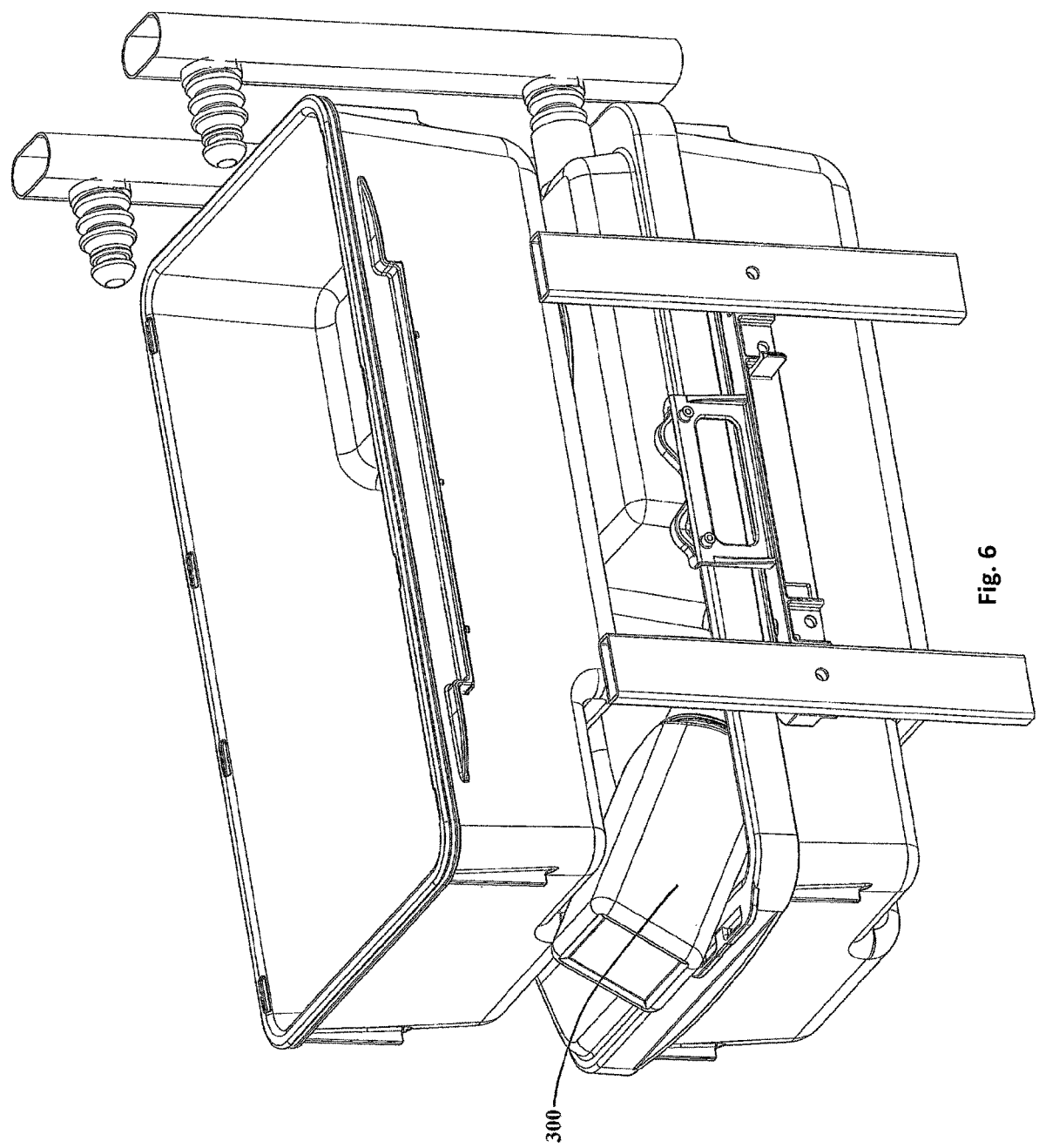
FIG. 6 shows a perspective view of two cages according to the present invention inserted in the respective cage positions on an animal housing shelving rack.

The reference is, for example, to FIGS. 5 and 6, which show a condition of cage 100 assembled and inserted in a cage position of a housing shelving rack.

Figure 7:
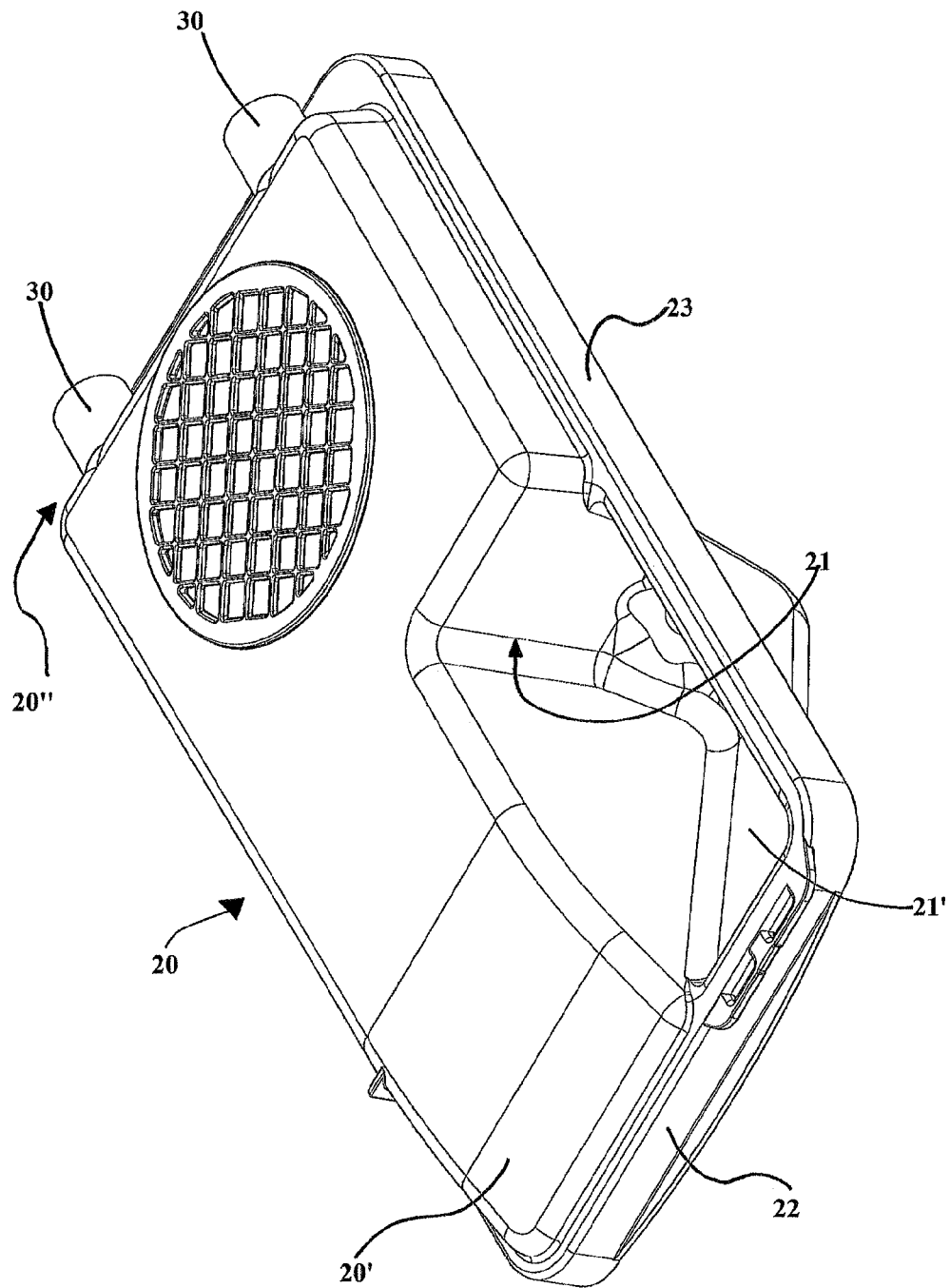
FIG. 7 shows a perspective view of the lid only of the housing cage according to the present invention.

As just described and with reference to FIGS. 5, 6 and 7, unlike base 10, lid 20 does not have a semi-spherical shape. On the contrary, a front zone 20' of the lid and a rear zone 20" of the lid can be identified on said lid, connection means 30 to the ventilation circuit 200 being provided at this rear zone. Said lid 20 will further comprise at least one seat 21 adapted to accommodate a watering bottle 300.

For this reason, the operator must necessarily position the lid on the base with the correct orientation of the lid so as to make it possible to insert the assembled cage into the shelving rack, while the fact of not needing to pay attention to the correct orientation of the base during the assembly of the cage is highly appreciated by operators.

Preferably, said seat 21 for said bottle 300 has at least one lead-in 21' for inserting the bottle which may consist of an inclined plane 21' with respect to the vertical direction, so as to facilitate the release of the liquid from the bottle by gravity.

With particular reference to FIG. 7, said lead-in 21' of said seat 21 will be arranged adjacent to the front edge 22 of lid 20.

Said seat 21 is thus positioned on said lid 20 so that said lead-in 21' for inserting said bottle 300 can be accessed frontally by the operator when the cage is inserted in the shelving rack.

Indeed, with the cage inserted in the shelving rack, the front zone 20' of the lid, comprising front edge 22, faces towards the operator, so said seat 21 will have an access in the front zone 20' of the lid, said lead-in 21' extending from front edge 22 towards rear edge 20" of lid 20.

Preferably, said seat 21 will be positioned on the lid adjacent to one of the side edges 23 of said lid 20, as shown in FIG. 7.

With the cage assembled and positioned in the shelving rack, as shown for example in FIGS. 5 and 6, a recess 15 obtained on the lower surface 11" of base 10 of cage 100 accommodated in the upper cage position, is at seat 21 for bottle 300 obtained on lid 20 of a second cage 100 housed in the cage position underneath, allowing to maximize the height of cages in the shelving rack thus minimizing the distance between a cage position and the adjacent one immediately above.

Although the preferred embodiment is shown, it is apparent that the present invention can equally envisage placing seat 21 centrally with respect to lid 20, again concerning a front edge to have frontal access. In this case, said at least one recess 25 will be placed adjacent to one of the short sides 12 of said base 10 in central position, so that to the cages assembled and inserted in the shelving rack there is correspondence between the position of the bottle of the cage underneath and recess 15 of the cage above.

As mentioned, raised portions 14 of said inner surface 11' of base wall 11 perform the function of environmental enrichment for the animals kept in the cage.

Advantageously, said raised portions and said recesses are obtained directly by molding of said base.

On one hand, the animals may climb onto said raised portions 14 also finding a more comfortable situation if, for example, the bedding which covers the bottom of the base is particularly moist. Furthermore, raised portions 14 may be used by the animals for physical exercise, playing activities and, for example, for more easily approaching the lid to edge 400 which may be a further enrichment device itself and also work as trough.

It has thus been shown that the cage for housing laboratory animals according to the present invention achieves the suggested objects.

In particular, it has been shown that the cage according to the present invention allows to optimize the row density of cages in height in a shelving rack.

In particular, in a shelving rack which is maintained under 2 meters, up to 12 rows of cages can be accommodated versus the 10 of the currently known systems, guaranteeing the possibility of extracting the drinking bottle frontally and easily without needing to extract the cage from the shelving rack even in part.

Furthermore, the housing cage according to the present invention allows to integrate an enrichment system which creates one or more additional levels for the animals in the base of an IVC while optimizing the overall dimensions of the cage itself.

The enrichment system is thus autoclavable together with the base and does not need to be removed and/or reassembled to the base each time.

It is not the last object achieved by the present invention to provide a cage provided with an integrated enrichment system for animals, which optimizes the cage design on a shelving rack, which is easy to handle, ergonomic and cost-effective to make, in particular to facilitate the movements of the cage itself and in particular of the base and the integrated enrichment system by the operator and such to allow to accommodate a high number of cages on an appropriately provided shelving rack.

The scope of protection of the claims must not be limited to illustrating preferred embodiments described by way of example, but should rather include all the features of patentable novelty which can be inferred from the present invention, including all the features that would be treated as equivalent by those skilled in the art.

The invention claimed is:

1. A cage for housing laboratory animals, comprising:
    a cage base and a lid attachable to said cage base and having a seat for receiving in a removable manner a drinking bottle, said cage base comprising a bottom wall defining a base plane and having an inner surface on which the animals can reside, and an outer surface, wherein said bottom wall defines a raised portion protruding into an interior of said cage base and configured with a plateau portion with respect to said base plane such that the animals can reside thereon;
    wherein said outer surface of the bottom wall includes a recess conforming to and aligned with said raised portion of said bottom wall, said recess being arranged so that, when said cage is placed directly above a second like cage inside a cage post of a housing shelf, said recess is in alignment with a second seat formed on a second lid of the second cage which is inserted in the cage post below the cage, wherein said cage base has a substantially quadrangular shape comprising a pair of short sides and a pair of long sides, wherein said recess is adjacent to one of said pair of short sides of said cage base and to one of the pair of long sides of said cage base which define a corner of said cage base.

2. The cage for housing laboratory animals according to claim 1, wherein said cage comprises on the outer surface of said bottom wall two recesses, arranged in correspondence to two diametrically opposite corners of said cage base.

3. The cage for housing laboratory animals according to claim 1, wherein said lid comprises a front area and a back area, the front area being configured to face outwards when said cage is inserted in a cage post of the housing shelf, and said back area further comprising connecting means for connecting the cage to a ventilation circuit arranged on the edge of the shelf.

4. The cage for housing laboratory animals according to claim 3, wherein said seat for said drinking bottle is arranged in the front area of said lid.

5. The cage for housing laboratory animals according to claim 4, wherein said front area of said lid comprises a front edge, wherein said seat is adjacent to said front edge.

* * * * *